(12) United States Patent
Ishihara et al.

(10) Patent No.: US 12,580,267 B2
(45) Date of Patent: Mar. 17, 2026

(54) BATTERY FRAME

(71) Applicant: HONDA MOTOR CO., LTD., Tokyo (JP)

(72) Inventors: Yuya Ishihara, Wako (JP); Kenta Kishii, Wako (JP); Hiromitsu Sato, Wako (JP); Tadahiro Fukushima, Wako (JP); Masataka Yoshida, Wako (JP); Seiji Kosaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 538 days.

(21) Appl. No.: 18/147,814

(22) Filed: Dec. 29, 2022

(65) Prior Publication Data

US 2023/0223637 A1     Jul. 13, 2023

(30) Foreign Application Priority Data

Jan. 7, 2022     (JP) ................................. 2022-001546

(51) Int. Cl.
*H01M 50/264*     (2021.01)
*H01M 50/211*     (2021.01)

(52) U.S. Cl.
CPC ....... *H01M 50/264* (2021.01); *H01M 50/211* (2021.01)

(58) Field of Classification Search
CPC .......................... H01M 50/264; H01M 50/211
See application file for complete search history.

(56) References Cited

U.S. PATENT DOCUMENTS

2023/0113935 A1* 4/2023 Akutsu ............. H01M 10/0481
429/156

FOREIGN PATENT DOCUMENTS

| JP | 2015076188 A | * | 4/2015 |
| JP | 2015149238 A | * | 8/2015 |
| JP | 2016-091991 A |   | 5/2016 |
| WO | 2020/194937 A1 |   | 10/2020 |

OTHER PUBLICATIONS

Ueda, JP2015149238A Machine Translation (Year: 2015).*
JP-2015076188-A, Machine Translation (Year: 2015).*
Japanese Office Action Corresponding to JP Application No. 2022-001546, dated Oct. 28, 2025, 6 pages.

* cited by examiner

*Primary Examiner* — Devina Pillay
(74) *Attorney, Agent, or Firm* — Rankin, Hill & Clark LLP

(57)     ABSTRACT

A battery frame includes a pair of flat spring plates, a pair of pressing plates, and connecting members connecting the pair of flat spring plates. Each of the flat spring plates includes first regions and a second region. The second region is located inward of the first regions in the stacking direction of a battery cell stack. The connecting members are attached to the flat spring plates via the first regions, and the pressing plates are attached to the flat spring plates via the second regions.

4 Claims, 12 Drawing Sheets

BATTERY FRAME

CROSS-REFERENCE TO RELATED APPLICATIONS

This application is based upon and claims the benefit of priority from Japanese Patent Application No. 2022-001546 filed on Jan. 7, 2022, the contents of which are incorporated herein by reference.

BACKGROUND OF THE INVENTION

Field of the Invention

The present invention relates to a battery frame.

Description of the Related Art

JP 2015-076188 A discloses a restraining structure for pressing a battery cell stack in a thickness direction. The restraining structure includes a pressing plate, a deformation plate and an end plate. The pressing plate presses the battery cell stack in the thickness direction. The deformation plate is welded to the pressing plate. The end plate is welded to the deformation plate. The end plate deforms the deformation plate to press the pressing plate against the battery cell stack.

SUMMARY OF THE INVENTION

In the restraining structure disclosed in JP 2015-076188 A, the end plate deforms the deformation plate when the end plate expands outward in the stacking direction of the battery cell stack. Therefore, it is necessary to provide a buffer member between the battery modules adjacent to each other in the stacking direction of the battery cell stack. The buffer member can prevent the adjacent battery modules from coming into direct contact with each other. However, since the buffer member is added, there is a problem that a manufacturing cost of a system in which the battery modules are mounted increases.

An object of the present invention is to solve the above-mentioned problem.

According to an aspect of the present invention, provided is a battery frame that holds a battery cell stack comprising a plurality of battery cells stacked in a thickness direction thereof, the battery frame comprising: a pair of flat spring plates; a pair of pressing plates; and a connecting member configured to connect the pair of flat spring plates, wherein the pair of pressing plates are provided between the pair of flat spring plates, the battery cell stack is provided between the pair of pressing plates, each of the flat spring plates includes a first region and a second region, the second region is located inward of the first region in a stacking direction of the battery cell stack, the connecting member is attached to each of the flat spring plates via the first region, and each of the pressing plates is attached to a corresponding one of the flat spring plates via the second region.

According to the present invention, it is possible to absorb the expansion and tolerance of the battery cells and pressurize the battery cells while suppressing the battery frame from expanding outward in the stacking direction of the battery cell stack.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is a cross-sectional view of the battery cell stack and the heat exchanger;
FIG. 10 is a cross-sectional view of the battery cell stack.

DETAILED DESCRIPTION OF THE INVENTION

First Embodiment

[Configuration of Battery Module]

Figure 1:
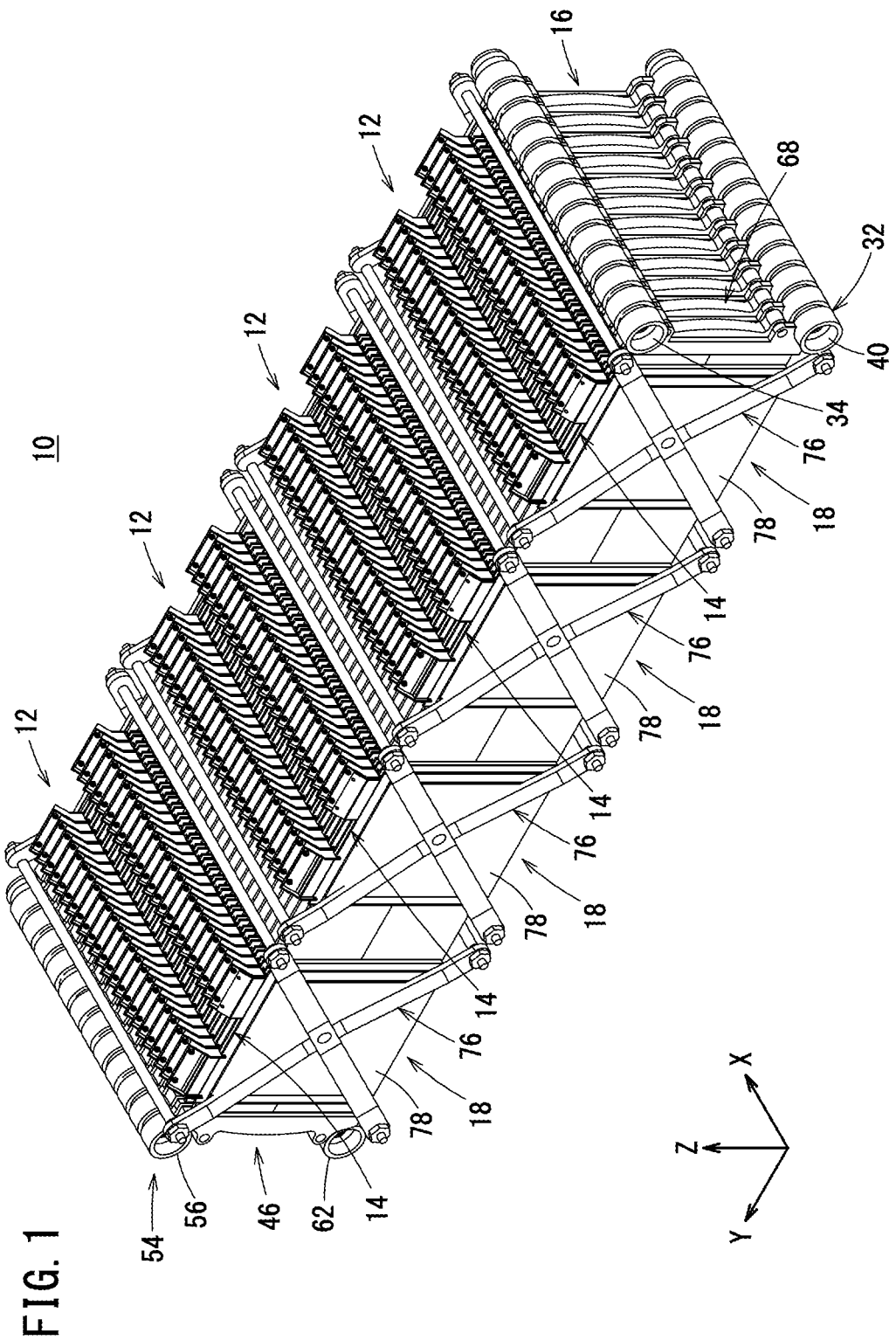
FIG. 1 is a perspective view of a battery module.

FIG. 1 is a perspective view of a battery module 10. In the following description of the structure of each member constituting the battery module 10, the description will be made using the directions and orientations of the X axis, the Y axis, and the Z axis indicated by the arrows in FIG. 1. Arrows indicating the X-axis, the Y-axis, and the Z-axis are also illustrated in the drawings other than FIG. 1, which will be described later. The directions and orientations of the X-axis, the Y-axis, and the Z-axis indicated by the arrows in the drawings other than FIG. 1 correspond to the directions and orientations of the X-axis, the Y-axis, and the Z-axis indicated by the arrows in FIG. 1.

The battery module 10 includes four battery cell stacks 12. The four battery cell stacks 12 are arranged in the Y-axis direction in a state where the longitudinal direction of each battery cell stack 12 is oriented in the X-axis direction. Each battery cell stack 12 includes a plurality of battery cells 14. In each battery cell stack 12, the plurality of battery cells 14 are stacked side by side in the X-axis direction. That is, the stacking direction of the battery cells 14 is the same as the X-axis direction. The battery cells 14 are stacked in the thickness direction thereof. In each battery cell stack 12, each battery cell 14 is connected in series with another battery cell 14.

The battery module 10 includes a heat exchanger 16. The heat exchanger 16 cools each battery cell 14.

The battery module 10 includes four battery frames 18. Each battery frame 18 holds each battery cell stack 12. Each battery frame 18 applies pressure to the battery cell stack 12 from both sides in the X-axis direction. Thus, expansion of each battery cell 14 is suppressed.

[Configuration of Battery Cell]

Figure 2:
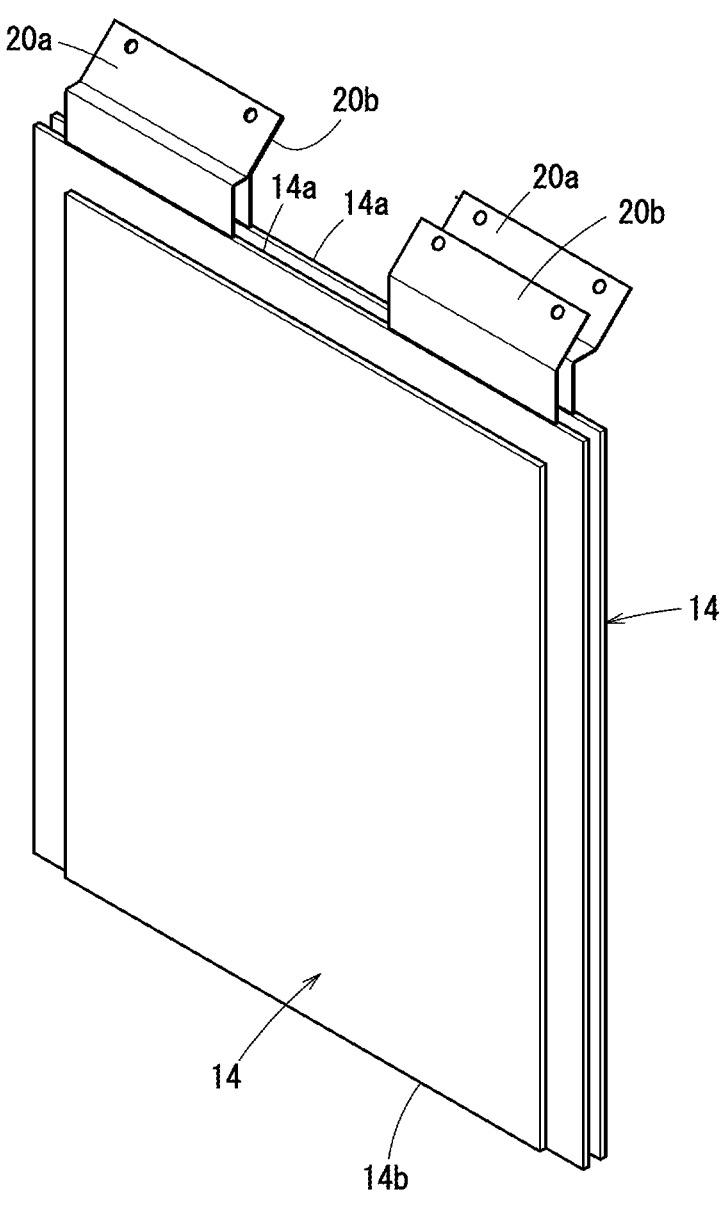
FIG. 2 is a perspective view of a battery cell.
Figure 2:
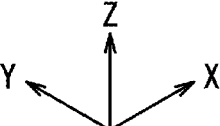

FIG. 2 is a perspective view of the battery cell 14. FIG. 2 shows a state in which two battery cells 14 are stacked.

The battery cell 14 is a laminated battery. The battery cell 14 is formed in a rectangular plate shape. The battery cell 14 is provided with a positive electrode tab 20a and a negative electrode tab 20*b*. The positive electrode tab 20*a* and the negative electrode tab 20*b* are provided on a first side 14*a* of a plurality of sides of the battery cell 14. The positive electrode tab 20*a* is formed in a rectangular plate shape. The negative electrode tab 20*b* is formed in a rectangular plate shape.

[Configuration of Heat Exchanger]

Figure 3:
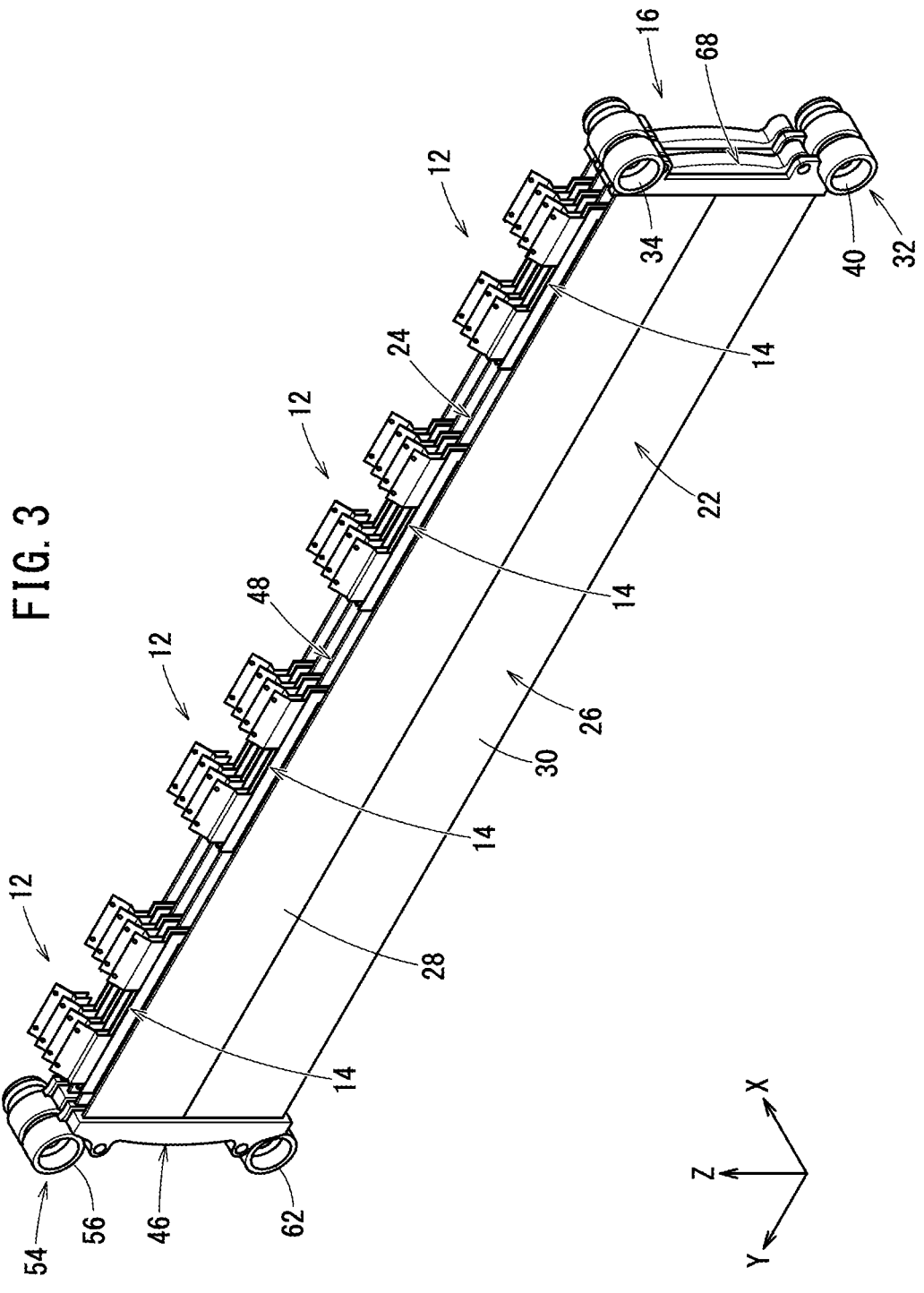
FIG. 3 is a perspective view of a battery cell stack and a heat exchanger.
Figure 4:
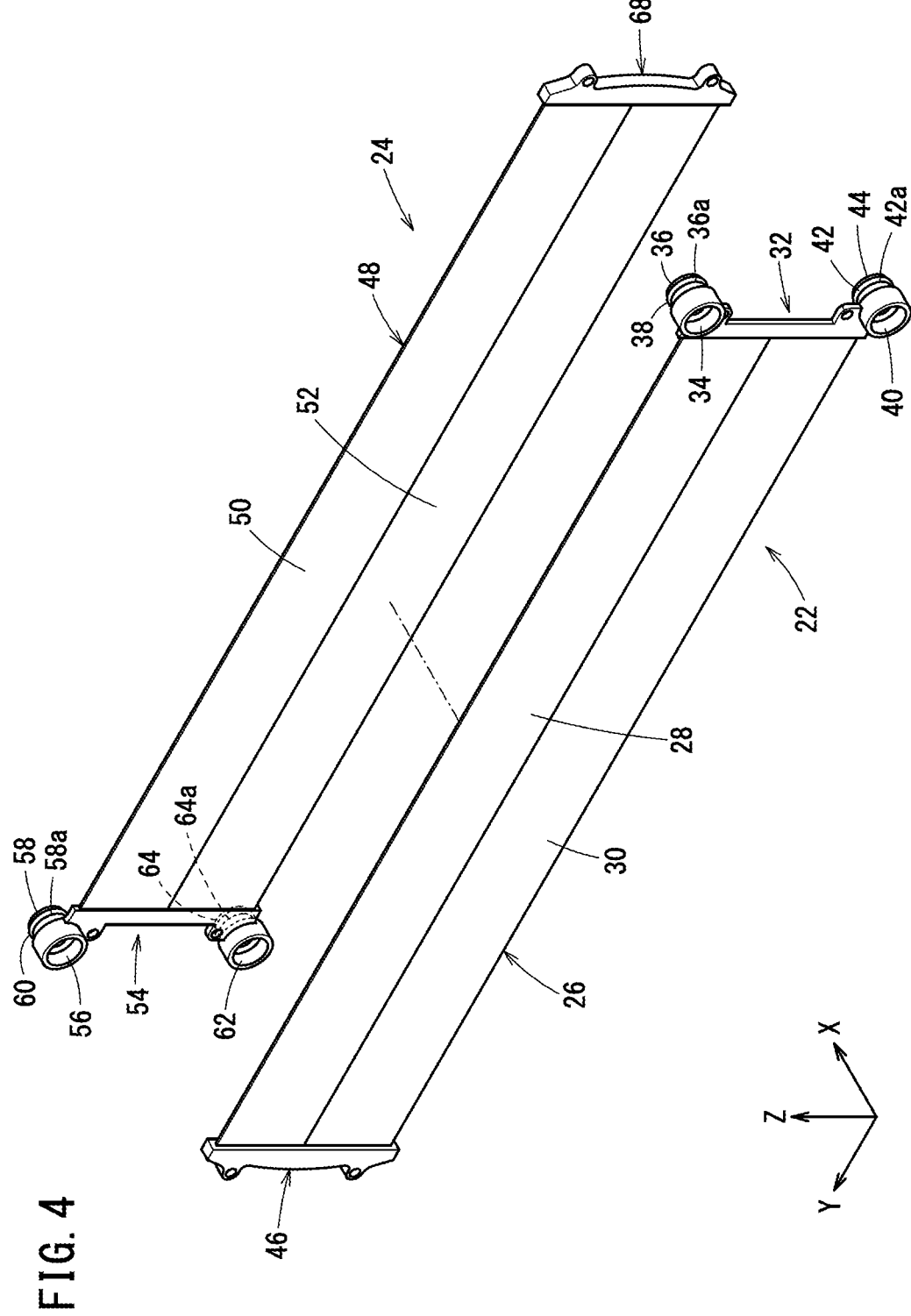
FIG. 4 is a perspective view of a first heat exchange plate and a second heat exchange plate.
Figure 5:
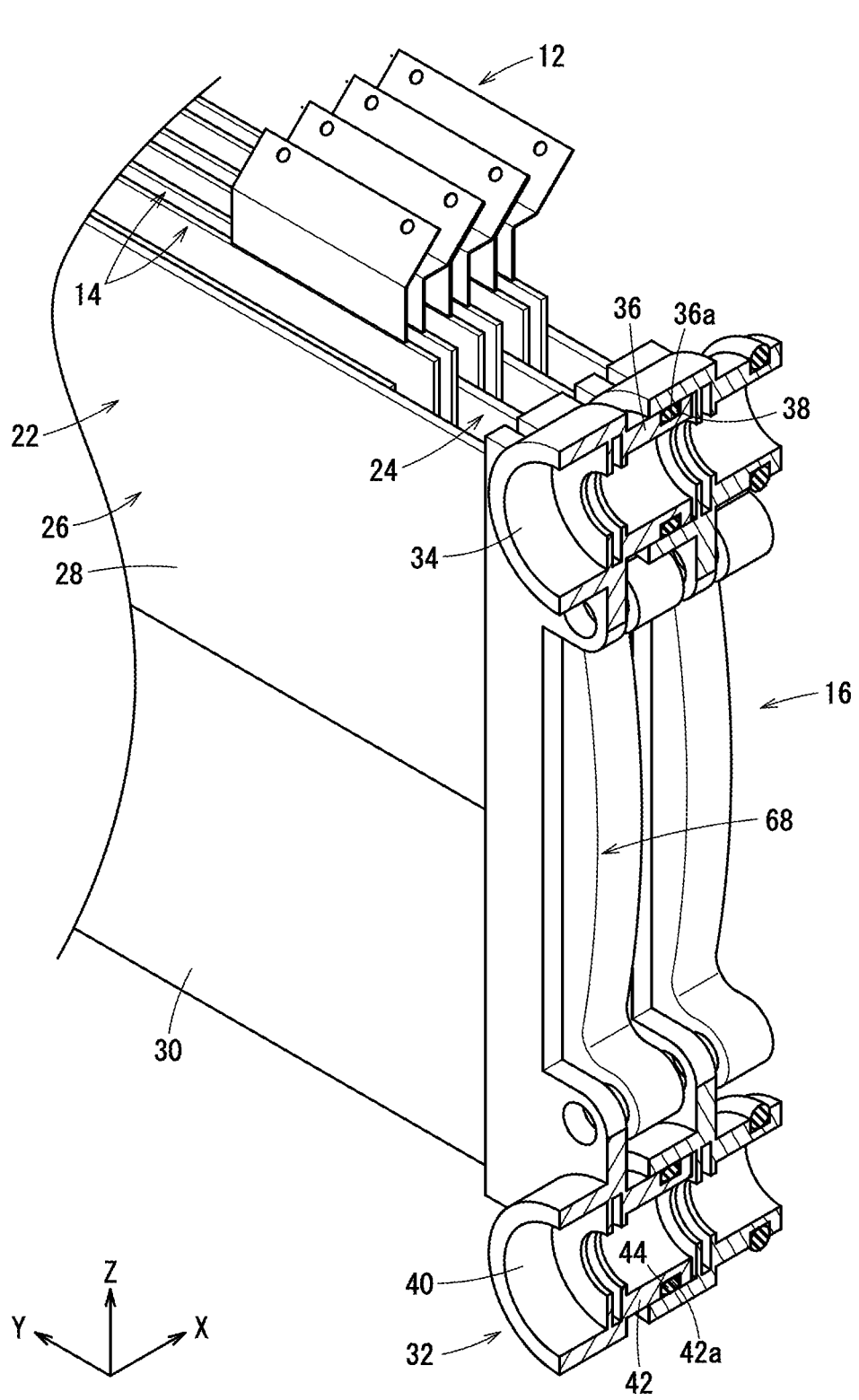
FIG. 5 is a cross-sectional perspective view of the battery cell stack and the heat exchanger.
Figure 6:
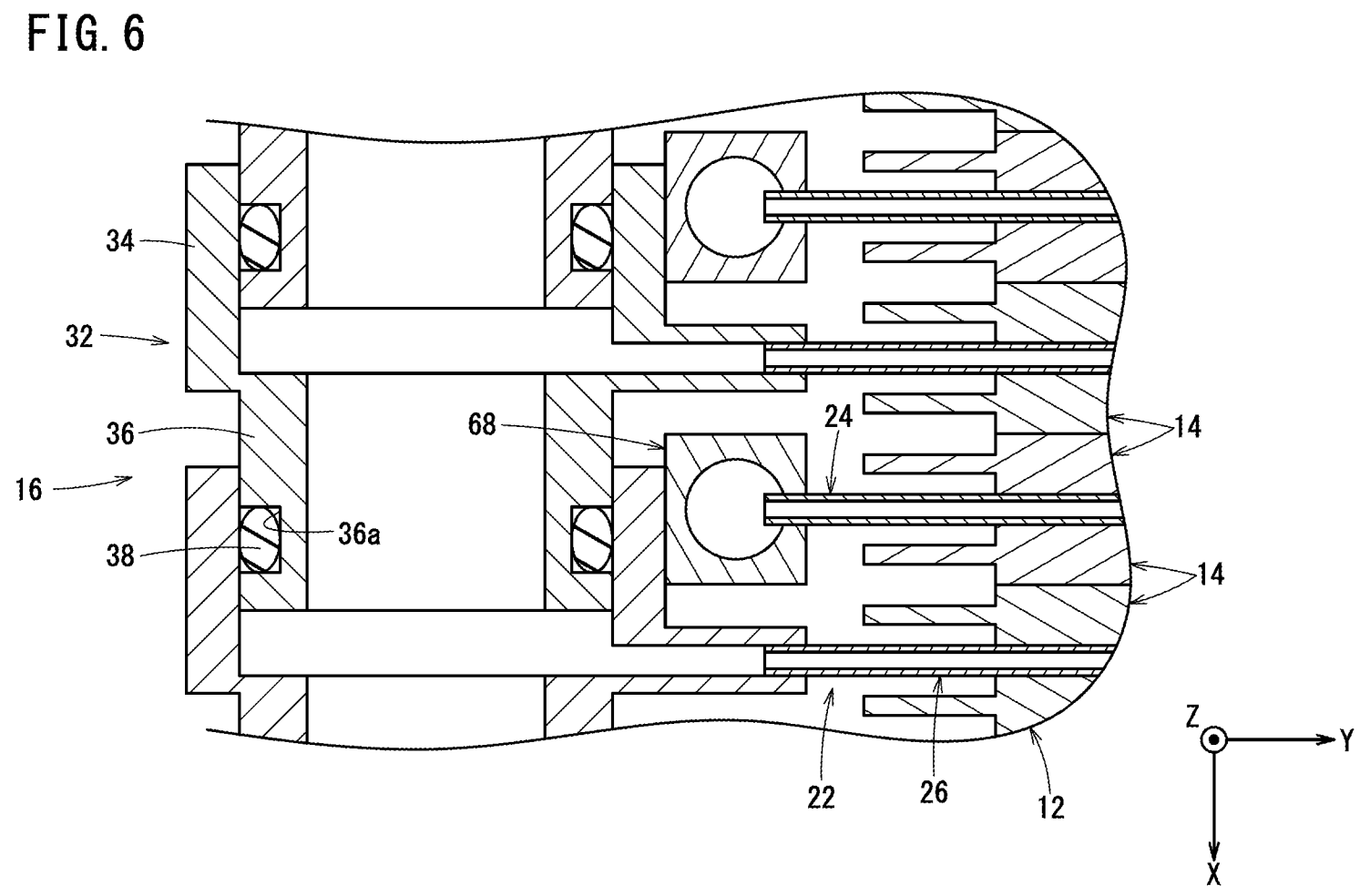

FIG. 3 is a perspective view of the battery cell stack 12 and the heat exchanger 16. In FIG. 3, a part of the battery cell stack 12 and a part of the heat exchanger 16 are illustrated. FIG. 4 is a perspective view of a first heat exchange plate 22 and a second heat exchange plate 24. FIG. 5 is a cross-sectional perspective view of the battery cell stack 12 and the heat exchanger 16. In FIG. 5, a part of the battery cell stack 12 and a part of the heat exchanger 16 are illustrated. FIG. 6 is a cross-sectional view of the battery cell stack 12 and the heat exchanger 16. In FIG. 6, a part of the battery cell stack 12 and a part of the heat exchanger 16 are illustrated.

The heat exchanger 16 includes a plurality of the first heat exchange plates 22 and a plurality of the second heat exchange plates 24. The plurality of first heat exchange plates 22 and the plurality of second heat exchange plates 24 are stacked side by side in the X-axis direction. The plurality of first heat exchange plates 22 and the plurality of second heat exchange plates 24 are stacked in the thickness direction of the first heat exchange plates 22 and the thickness direction of the second heat exchange plates 24. The plurality of first heat exchange plates 22 and the plurality of second heat exchange plates 24 are configured such that the first heat exchange plate 22 and the second heat exchange plate 24 are alternately stacked.

The structure of the second heat exchange plate 24 is the same as that of the first heat exchange plate 22. In the heat exchanger 16, the direction in which the first heat exchange plate 22 is disposed is different from the direction in which the second heat exchange plate 24 is disposed.

The first heat exchange plate 22 includes a first water jacket 26. The longitudinal direction of the first water jacket 26 extends in the Y-axis direction. The first water jacket 26 includes a first forward flow path 28 and a first return flow path 30. In the Z-axis direction, the first forward flow path 28 is provided on the Z-axis positive side of the center of the first water jacket 26. In the Z-axis direction, the first return flow path 30 is provided on the Z-axis negative side of the center of the first water jacket 26. Cooling water flows inside the first forward flow path 28. The cooling water flows through the first forward flow path 28 from the negative side in the Y-axis direction toward the positive side in the Y-axis direction. The cooling water flows inside the first return flow path 30. The cooling water flows through the first return flow path 30 from the positive side in the Y-axis direction toward the negative side in the Y-axis direction. That is, the Y-axis direction is the same as the flow direction in which the cooling water flows inside the first water jacket 26.

The first heat exchange plate 22 includes a first water supply/discharge header 32. The first water supply/discharge header 32 is attached to an end portion of the first water jacket 26 on the negative side in the Y axis direction. The first water supply/discharge header 32 includes a first water supply inlet 34 for supplying cooling water to the first forward flow path 28. The first water supply inlet 34 includes a first water supply connection portion 36. The first water supply connection portion 36 is inserted into the first water supply inlet 34 of another first heat exchange plate 22 located on the positive side in the X-axis direction. The first water supply connection portion 36 includes a seal groove 36*a*. A seal member 38 is attached to the seal groove 36*a*.

The first water supply/discharge header 32 includes a first water discharge outlet 40 for discharging the cooling water from the first return flow path 30. In the Y-axis direction, the first water discharge outlet 40 is disposed on the same side of the first water jacket 26 as the first water supply inlet 34. The first water discharge outlet 40 includes a first water discharge connection portion 42. The first water discharge connection portion 42 is inserted into the first water discharge outlet 40 of another first heat exchange plate 22 located on the positive side in the X-axis direction. The first water discharge connection portion 42 includes a seal groove 42*a*. A seal member 44 is attached to the seal groove 42*a*.

The first heat exchange plate 22 includes a first turn header 46. The first turn header 46 is attached to an end portion of the first water jacket 26 on the positive side in the Y-axis direction. Thus, the first turn header 46 is disposed on the opposite side of the first water jacket 26 from the first water supply inlet 34 and the first water discharge outlet 40. The first turn header 46 causes the cooling water flowing from the first forward flow path 28 to flow to the first return flow path 30. The first turn header 46 is formed in a curved surface shape protruding toward the outer side of the first heat exchange plate 22 in the Y-axis direction. As a result, the first turn header 46 can smoothly change the direction of flow of the cooling water flowing from the first forward flow path 28 and cause the cooling water to flow to the first return flow path 30.

The second heat exchange plate 24 includes a second water jacket 48. The longitudinal direction of the second water jacket 48 extends in the Y-axis direction. The second water jacket 48 includes a second forward flow path 50 and a second return flow path 52. In the Z-axis direction, the second forward flow path 50 is provided on the Z-axis positive side of the center of the second water jacket 48. In the Z-axis direction, the second return flow path 52 is provided on the Z-axis negative side of the center of the second water jacket 48. Cooling water flows inside the second forward flow path 50. The cooling water flows through the second forward flow path 50 from the positive side in the Y-axis direction toward the negative side in the Y-axis direction. The cooling water flows inside the second return flow path 52. The cooling water flows through the second return flow path 52 from the negative side in the Y-axis direction toward the positive side in the Y-axis direction. That is, the Y-axis direction is the same as the flow direction in which the cooling water flows inside the second water jacket 48.

The second heat exchange plate 24 includes a second water supply/discharge header 54. The second water supply/discharge header 54 is attached to an end portion of the second water jacket 48 on the positive side in the Y axis direction. The second water supply/discharge header 54 includes a second water supply inlet 56 for supplying cooling water to the second forward flow path 50. In the Y-axis direction, the second water supply inlet 56 is provided on the opposite side of the first water jacket 26 and the second water jacket 48 from the first water supply inlet 34. The second water supply inlet 56 includes a second water supply connection portion 58. The second water supply connection portion 58 is inserted into the second water supply inlet 56 of another second heat exchange plate 24 located on the positive side in the X-axis direction. The second water supply connection portion 58 includes a seal groove 58*a*. A seal member 60 is attached to the seal groove 58*a*. The second water supply/discharge header 54 includes a second water discharge outlet 62 for discharging the cooling water from the second return flow path 52. In the Y-axis direction, the second water discharge outlet 62 is disposed on the same side of the second water jacket 48 as the second water supply inlet 56. In the Y-axis direction, the second water discharge outlet 62 is provided on the opposite side of the first water jacket 26 and the second water jacket 48 from the first water discharge outlet 40. The second water discharge outlet 62 includes a second water discharge connection portion 64. The second water discharge connection portion 64 is inserted into the second water discharge outlet 62 of another second heat exchange plate 24 located on the positive side in the X-axis direction. The second water discharge connection portion 64 includes a seal groove 64a. A seal member (not shown) is attached to the seal groove 64a.

The second heat exchange plate 24 includes a second turn header 68. The second turn header 68 is attached to an end portion of the second water jacket 48 on the negative side in the Y-axis direction. Thus, the second turn header 68 is disposed on the opposite side of the second water jacket 48 from the second water supply inlet 56 and the second water discharge outlet 62. The second turn header 68 causes the cooling water flowing from the second forward flow path 50 to flow to the second return flow path 52. The second turn header 68 is formed in a curved surface shape protruding toward the outer side of the second heat exchange plate 24 in the Y-axis direction. As a result, the second turn header 68 can smoothly change the direction of flow of the cooling water flowing from the second forward flow path 50 and cause the cooling water to flow to the second return flow path 52.

Figure 7:
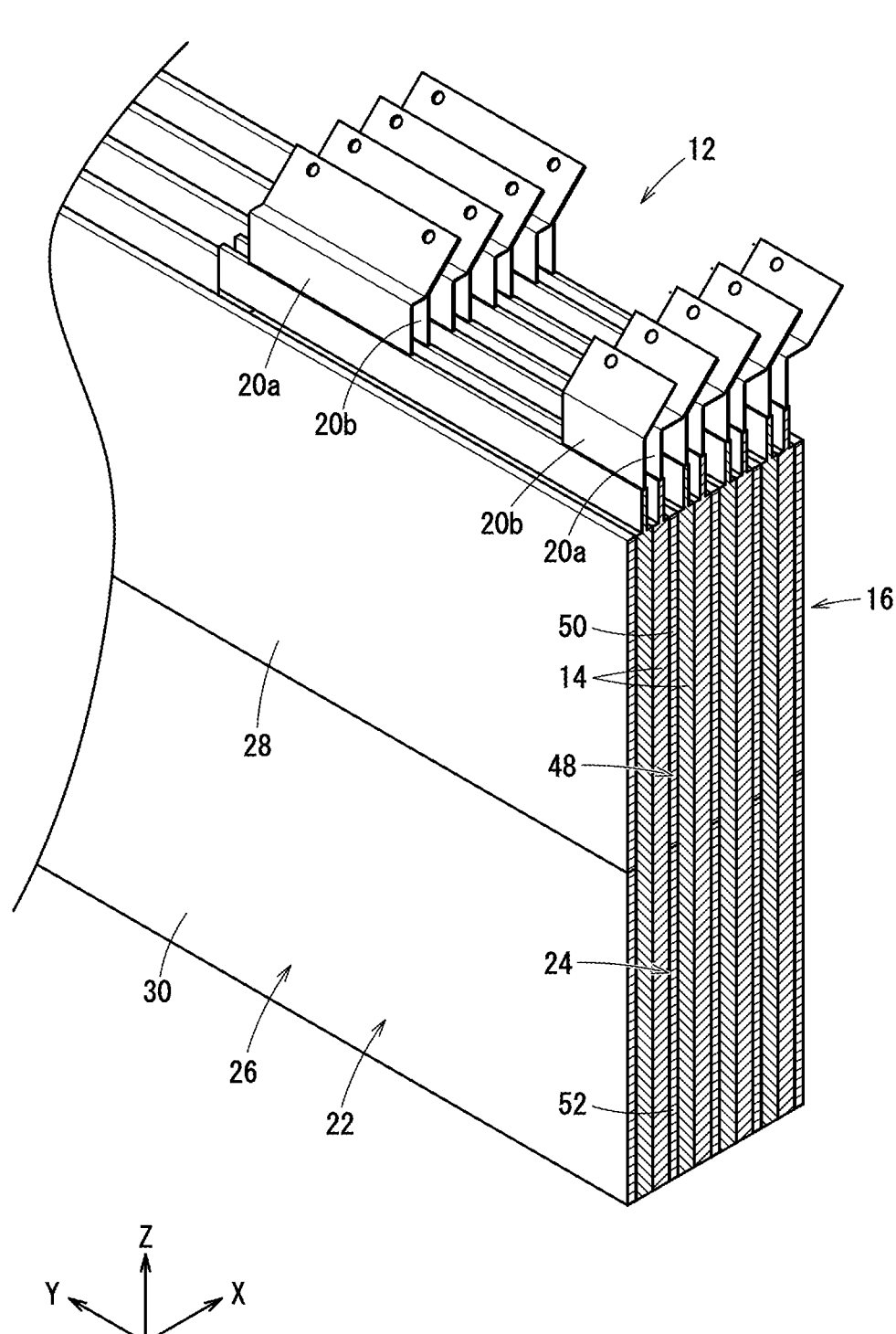
FIG. 7 is a cross-sectional perspective view of the battery cell stack and the heat exchanger.

FIG. 7 is a cross-sectional perspective view of the battery cell stack 12 and the heat exchanger 16. In FIG. 7, a part of the battery cell stack 12 and a part of the heat exchanger 16 are illustrated.

Two battery cells 14 are disposed between the first heat exchange plate 22 and the second heat exchange plate 24 in the X-axis direction. The two battery cells 14 are stacked in the thickness direction. Each of the outer surfaces of the two stacked battery cells 14 is in direct contact with the first water jacket 26 of the first heat exchange plate 22 or the second water jacket 48 of the second heat exchange plate 24. Each battery cell 14 is disposed between the first heat exchange plate 22 and the second heat exchange plate 24 in a state where the positive electrode tab 20a and the negative electrode tab 20b face the positive side in the Z-axis direction.

[Battery Cell Connection Structure]

Figure 8:
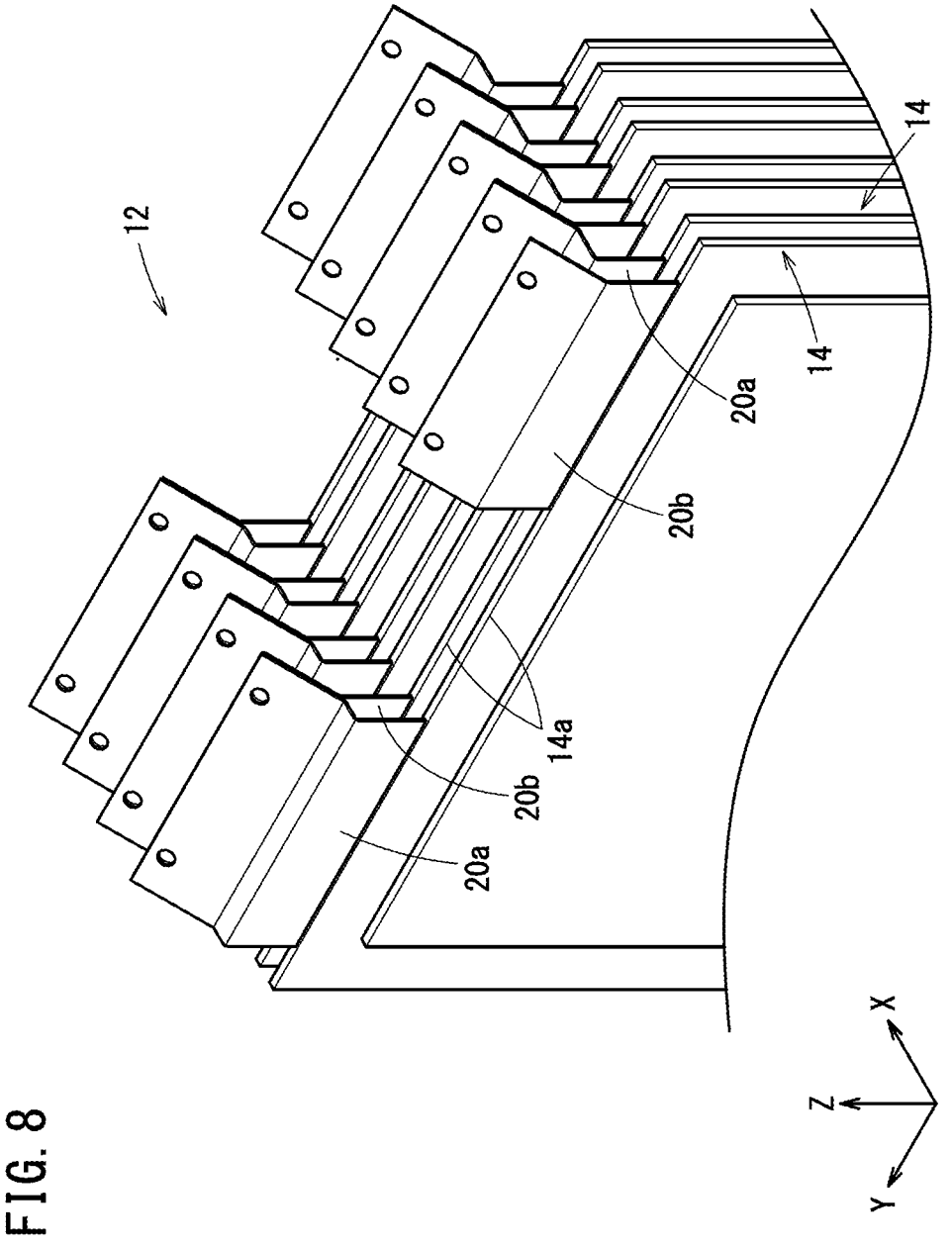
FIG. 8 is a perspective view of the battery cell stack.
Figure 9:
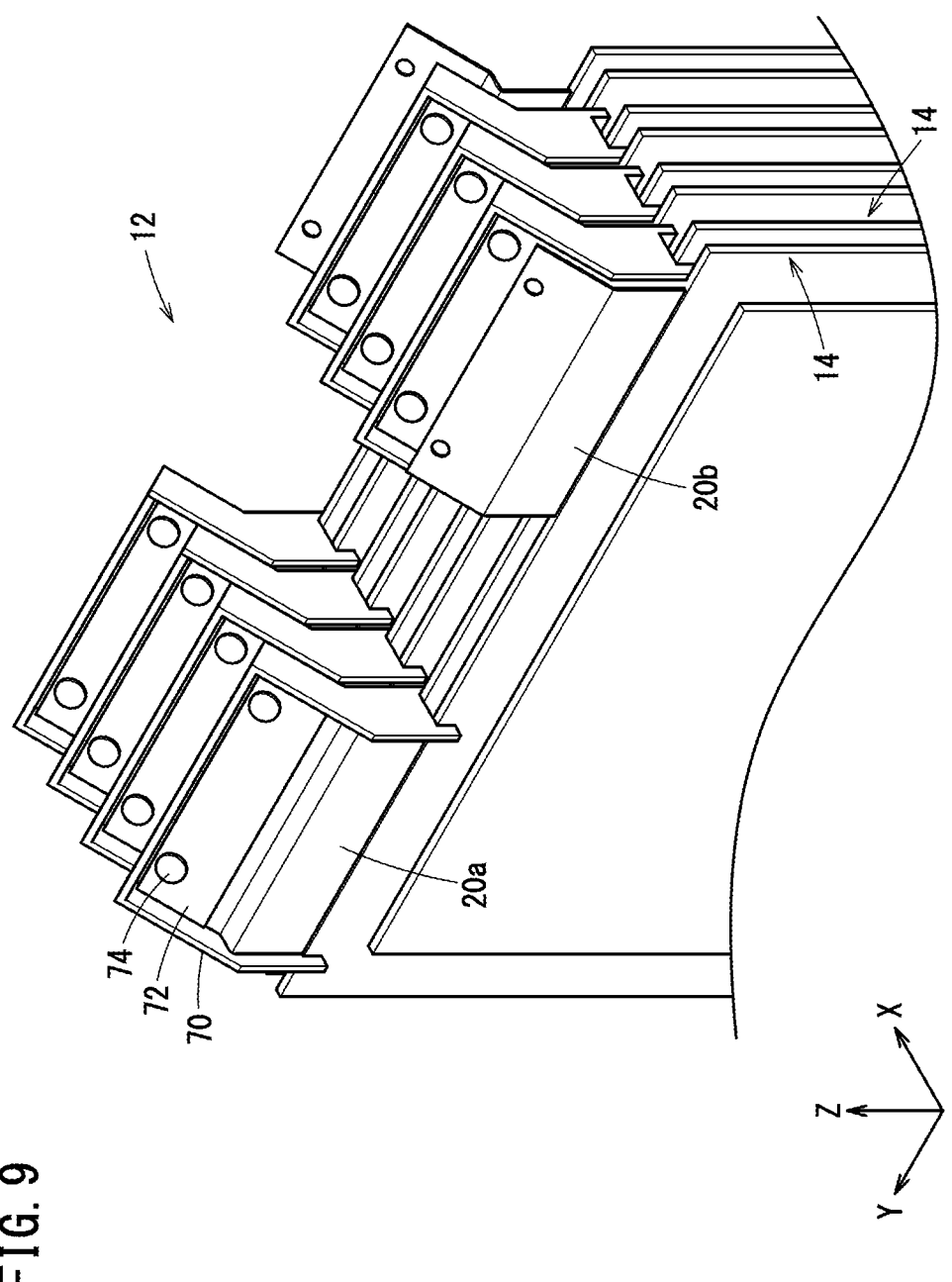
FIG. 9 is a perspective view of the battery cell stack.
Figure 10:
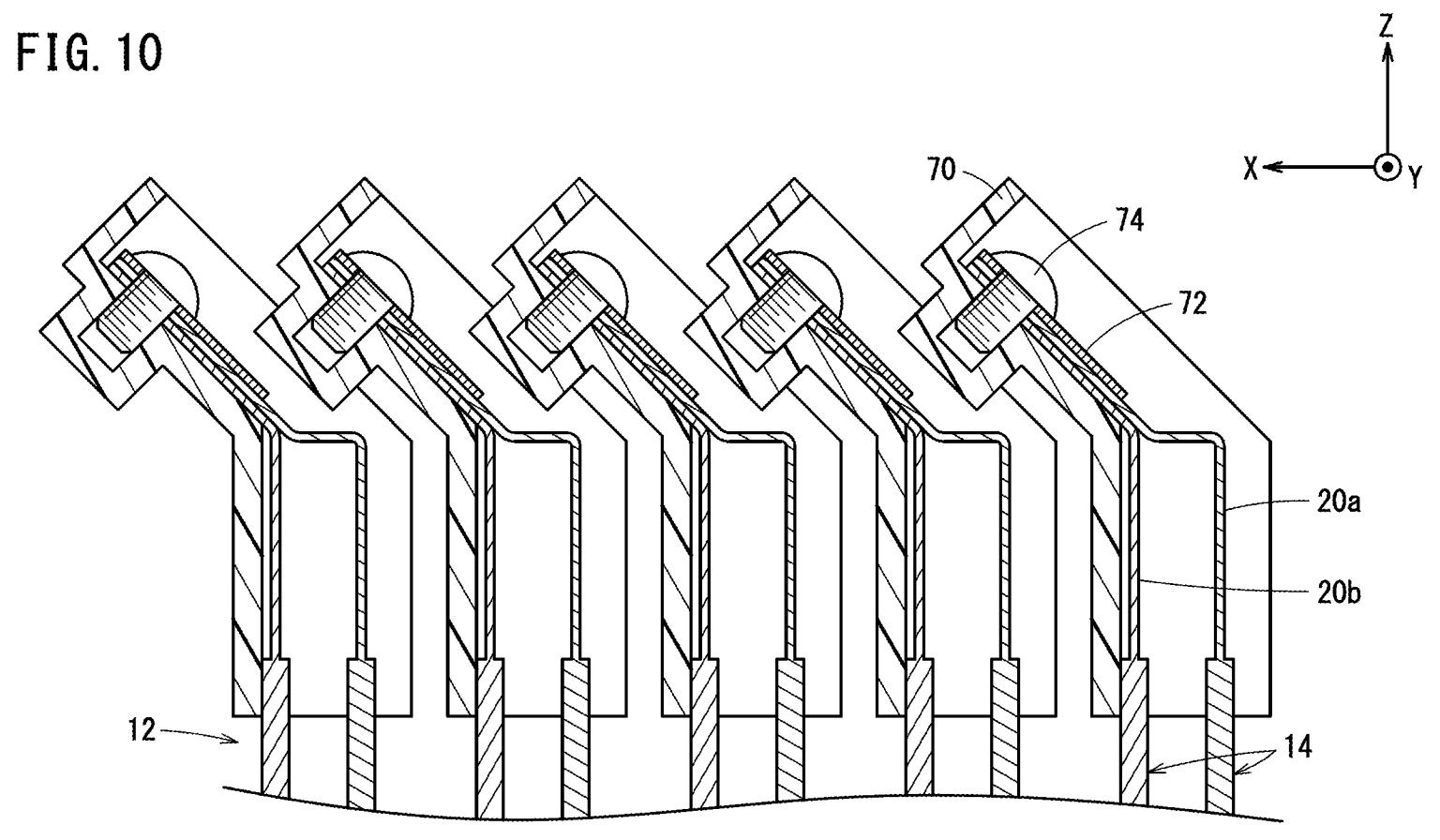

FIG. 8 is a perspective view of the battery cell stack 12. FIG. 9 is a perspective view of the battery cell stack 12. FIG. 10 is a cross-sectional view of the battery cell stack 12.

The positive electrode tab 20a of each battery cell 14 is connected to the negative electrode tab 20b of another adjacent battery cell 14 disposed on the positive side in the X-axis direction. The positive electrode tab 20a and the negative electrode tab 20b are stacked in the thickness direction. Each of the positive electrode tab 20a and the negative electrode tab 20b is bent to be inclined with respect to the X-axis direction. The X-axis direction is the same direction as the direction in which the battery cells 14 are stacked together. Each of the positive electrode tab 20a and the negative electrode tab 20b is bent to be inclined with respect to the Z-axis direction. The Z-axis direction is the same as the direction in which the first side 14a of each battery cell 14 and a second side 14b (FIG. 2) on the opposite side from the first side 14a are connected together.

In a state where the positive electrode tab 20a and the negative electrode tab 20b are sandwiched between a tab holder 70 and a retaining plate 72, the tab holder 70 and the retaining plate 72 are fastened to each other by screws 74.

[Configuration of Battery Frame]

Figure 11:
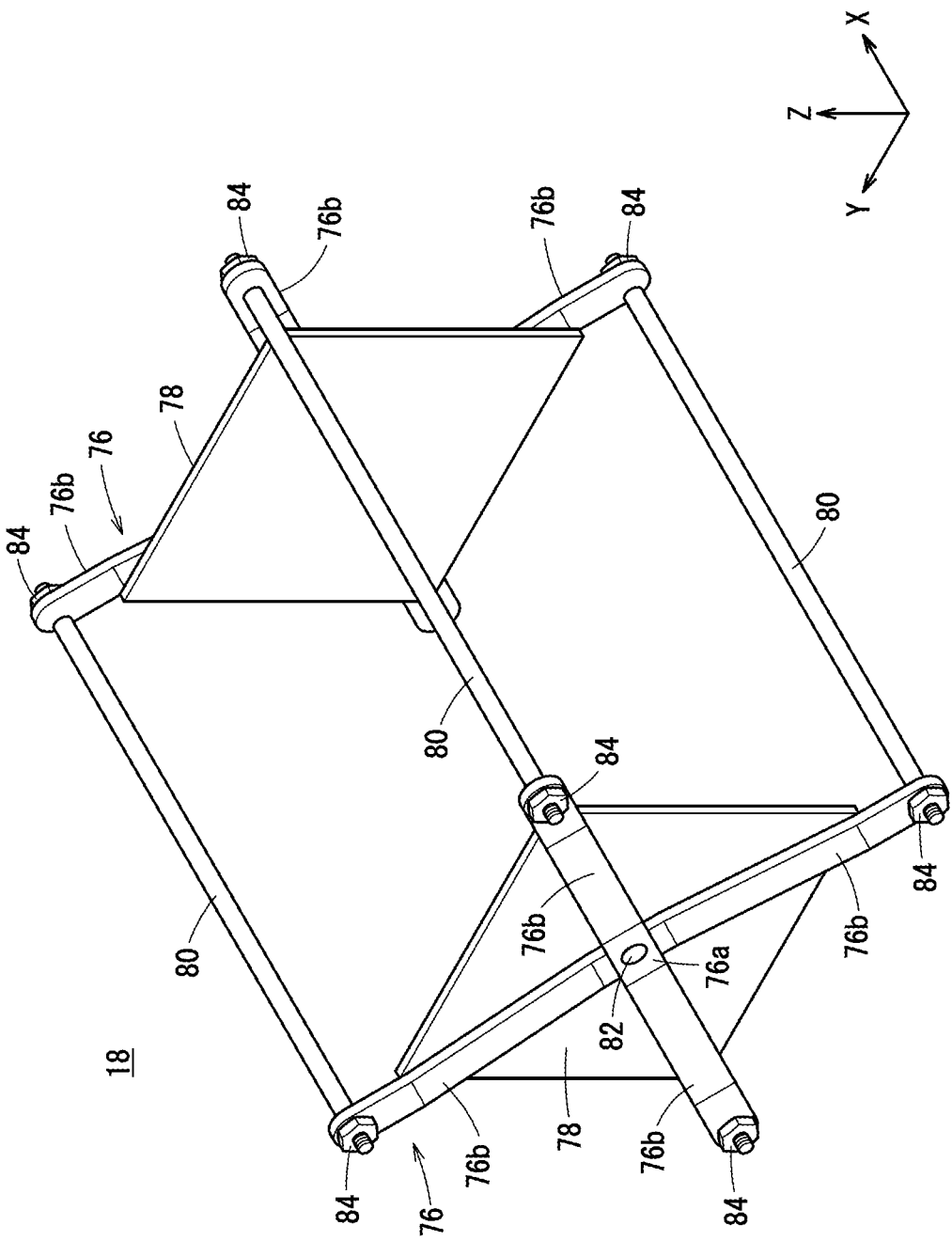
FIG. 11 is a perspective view of a battery frame.
Figure 12:
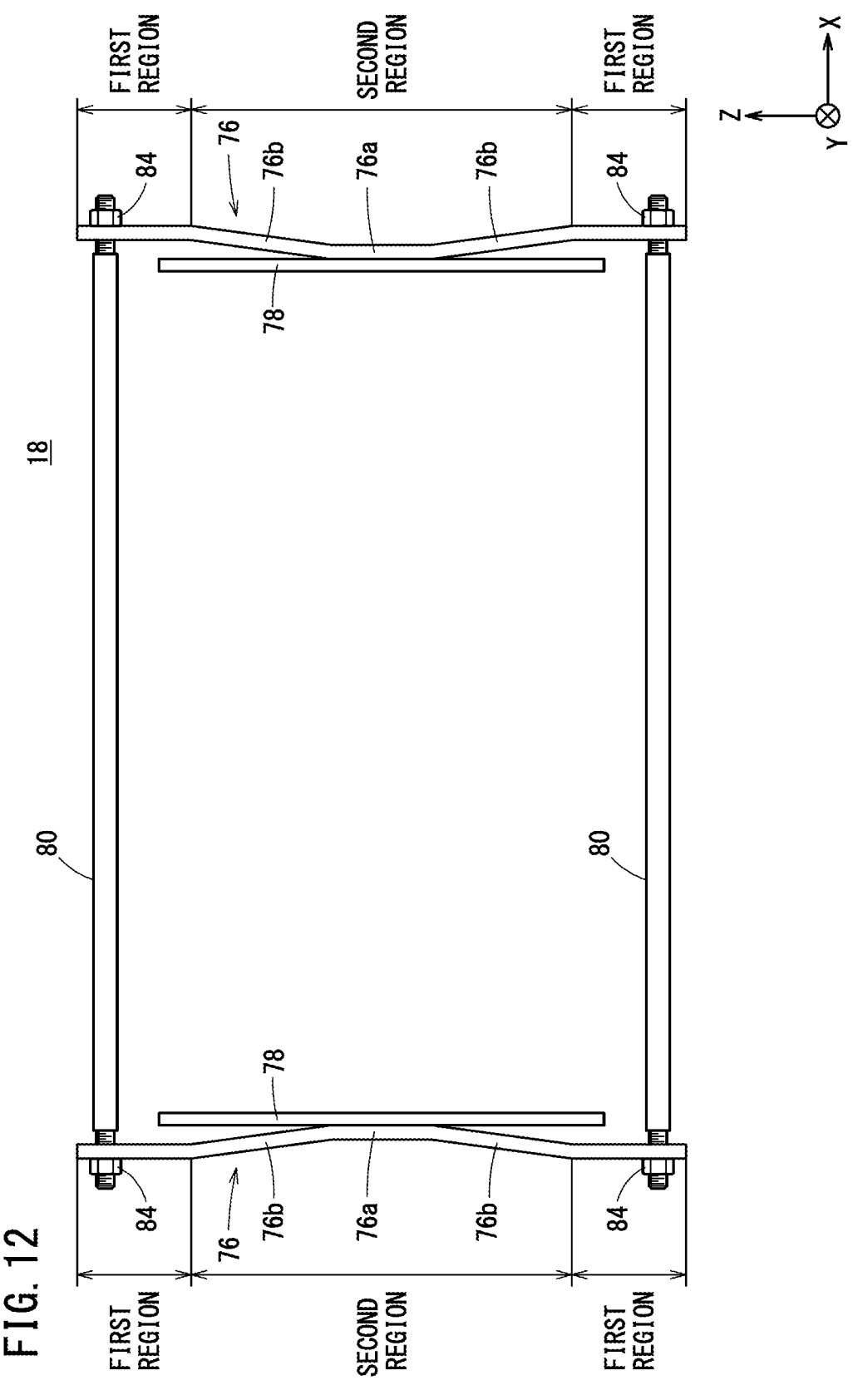
FIG. 12 is a side view of the battery frame.

FIG. 11 is a perspective view of the battery frame 18. FIG. 12 is a side view of the battery frame 18.

The battery frame 18 includes a pair of flat spring plates 76, a pair of pressing plates 78, and four connecting shafts 80. The connecting shaft 80 corresponds to a connecting member of the present invention.

The pair of pressing plates 78 are provided between the pair of flat spring plates 76. The battery cell stack 12 is provided between the pair of pressing plates 78 (FIG. 1). Each connecting shaft 80 extends in the X-axis direction. Each connecting shaft 80 connects the pair of flat spring plates 76. The connecting shaft 80 of the present embodiment has a round bar shape. The pair of flat spring plates 76 may be connected by plate-shaped members instead of the connecting shafts 80.

Each flat spring plate 76 includes a central portion 76a and four arm portions 76b. Each arm portion 76b extends from the central portion 76a. Each arm portion 76b extends toward the outer side of the battery frame 18 in the X-axis direction so as to be oblique relative to the Z-axis direction.

Each flat spring plate 76 includes first regions and a second region. Each of the first region is a region of a tip portion of each arm portion 76b. The second region is a region other than the first regions. The second region includes the central portion 76a. In the X-axis direction, the second region is located on the further inward of the battery frame 18 than the first regions.

Each pressing plate 78 is attached to the central portion 76a of each flat spring plate 76. Each pressing plate 78 may be attached to the second region of the arm portions 76b of each flat spring plate 76. Each pressing plate 78 is attached to each flat spring plate 76 by a screw 82. Each pressing plate 78 may be attached to each flat spring plate 76 by welding.

In the Z-axis direction, the first regions of the arm portions 76b of each flat spring plate 76 overlap each pressing plate 78. In the Y-axis direction, the first regions of the arm portions 76b of each flat spring plate 76 overlap each pressing plate 78. The Z-axis direction and the Y-axis direction are the same as the direction orthogonal to the stacking direction of the battery cell stack 12.

The connecting shafts 80 are respectively attached to the first regions of the arm portions 76b of the flat spring plates 76. Adjustment bolts 84 are screwed into each connecting shaft 80 on the outer side of each flat spring plate 76. By tightening the adjustment bolts 84 in a state where the battery cell stack 12 is disposed between the pair of pressing plates 78, the pressure applied from the pair of pressing plates 78 to the battery cell stack 12 increases. By adjusting the amount of tightening of the adjustment bolts 84, the force applied to the battery cell stack 12 is set to 200 kPa to 400 kPa.

Advantageous Effects

The battery frame 18 of the present embodiment includes the flat spring plates 76. The flat spring plates 76 press the battery cell stack 12 in the stacking direction via the pressing plates 78. In this case, the second regions of the flat spring plates 76 are deformed outward in the stacking direction of the battery cell stack 12.

The second regions of the flat spring plates 76 are located inward of the first regions in the stacking direction of the battery cell stack 12. As a result, the second regions are deformed in a range inward of the first regions, and can thereby press the battery cell stack 12 in the stacking direction. Therefore, the battery frame 18 can be suppressed from expanding outward in the stacking direction of the battery cell stack 12.

In the battery frame 18 of the present embodiment, the first regions of each flat spring plate 76 overlap each pressing plate 78 in the direction orthogonal to the stacking direction of the battery cell stack 12 (when viewed from the stacking direction of the battery cell stack 12). The pressing plate 78 is attached to the flat spring plate 76 via the second region. When an excessive force acts on the pressing plate 78 from the battery cell stack 12, the pressing plate 78 comes into contact with the first regions. As a result, it is possible to suppress the second region from being deformed to the outside of the first regions.

In the battery frame 18 of the present embodiment, the adjustment bolts 84 are screwed into each connecting shaft 80 on the outer side of each flat spring plate 76. The pressure applied to the battery cell stack 12 can be adjusted by adjusting the amount of tightening of the adjustment bolts 84.

In the battery frame 18 of the present embodiment, the pair of flat spring plates 76 are connected by the connecting shafts 80. The weight of the battery frame 18 can be reduced as compared with a case where a housing covering the entire battery cell stack 12 is provided.

The present invention is not limited to the embodiment described above, and various configurations could be adopted therein without departing from the essence and gist of the present invention.

Invention Obtained from Embodiment

The invention that can be grasped from the above embodiment will be described below.

The battery frame (18) that holds the battery cell stack (12) in which the plurality of battery cells (14) are stacked in the thickness direction thereof includes: the pair of flat spring plates (76); the pair of pressing plates (78); and the connecting member (80) configured to connect the pair of flat spring plates, wherein the pair of pressing plates are provided between the pair of flat spring plates, the battery cell stack is provided between the pair of pressing plates, each of the flat spring plates includes the first region and the second region, the second region is located inward of the first region in the stacking direction of the battery cell stack, the connecting member is attached to each of the flat spring plates via the first region, and each of the pressing plates is attached to a corresponding one of the flat spring plates via the second region. As a result, the battery frame can be suppressed from expanding outward in the stacking direction of the battery cell stack.

In the battery frame described above, the first region and each of the pressing plates may overlap each other in a direction orthogonal to the stacking direction. As a result, it is possible to suppress the second region from being deformed to the outside of the first region.

In the battery frame described above, the adjustment bolts (84) may be attached to the connecting member, and the adjustment bolts may adjust a pressure applied from the pressing plates to the battery cell stack in the stacking direction. The pressure applied to the battery cell stack can be adjusted by adjusting the amount of tightening of the adjustment bolts.

In the battery frame described above, the connecting member is the shaft extending in the stacking direction. As a result, the weight of the battery frame can be reduced.

The invention claimed is:

1. A battery frame that holds a battery cell stack comprising a plurality of battery cells stacked in a thickness direction thereof, the battery frame comprising:

a pair of flat spring plates;

a pair of pressing plates; and a connecting member configured to connect the pair of flat spring plates, wherein the pair of pressing plates are provided between the pair of flat spring plates, the battery cell stack is provided between the pair of pressing plates, each of the flat spring plates includes a first region and a second region, the second region of each of the flat spring plates is located inward of the first region of each of the flat spring plates in a stacking direction of the battery cell stack, the connecting member is attached to the first region of each of the flat spring plates, each of the pressing plates is attached to the second region of a corresponding one of the flat spring plates, each of the flat spring plates includes four arm portions extending from a central portion of each of the flat spring plates, each of the pressing plates is disposed inward of the connecting member, and each of the pressing plates is attached to the central portion of each of the flat spring plates with a fastening member.

2. The battery frame according to claim 1, wherein the first region of each of the flat spring plates and each of the pressing plates overlap each other in a direction orthogonal to the stacking direction.

3. The battery frame according to claim 1, wherein adjustment bolts are attached to the connecting member, and the adjustment bolts adjust a pressure applied from the pressing plates to the battery cell stack in the stacking direction.

4. The battery frame according to claim 1, wherein the connecting member is a shaft extending in the stacking direction.

* * * * *